(12) United States Patent
Kulik

(10) Patent No.: US 11,588,671 B2
(45) Date of Patent: Feb. 21, 2023

(54) CYCLIC PREFIX (CP) DETECTION AND REMOVAL IN A WIRELESS COMMUNICATIONS SYSTEM (WCS)

(71) Applicant: CORNING RESEARCH & DEVELOPMENT CORPORATION, Corning, NY (US)

(72) Inventor: Shlomi Kulik, Elkana (IL)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 9 days.

(21) Appl. No.: 17/403,961

(22) Filed: Aug. 17, 2021

(65) Prior Publication Data
US 2022/0052891 A1 Feb. 17, 2022

Related U.S. Application Data

(60) Provisional application No. 63/066,537, filed on Aug. 17, 2020.

(51) Int. Cl.
| | |
|---|---|
| *H04B 10/00* | (2013.01) |
| *H04L 27/26* | (2006.01) |
| *H04W 72/0453* | (2023.01) |
| *H04B 10/27* | (2013.01) |
| *H04J 14/00* | (2006.01) |

(52) U.S. Cl.
CPC ......... *H04L 27/2605* (2013.01); *H04B 10/27* (2013.01); *H04W 72/0453* (2013.01)

(58) Field of Classification Search
CPC .......... H04B 10/2575; H04B 10/25752; H04B 10/25753
See application file for complete search history.

(56) References Cited

U.S. PATENT DOCUMENTS

| | | | | |
|---|---|---|---|---|
| 2018/0076914 | A1* | 3/2018 | Zhou | H04L 41/0843 |
| 2019/0089478 | A1* | 3/2019 | Effenberger | H04J 14/0267 |
| 2019/0223232 | A1* | 7/2019 | Murakami | H04B 10/25752 |

\* cited by examiner

*Primary Examiner* — Daniel G Dobson
(74) *Attorney, Agent, or Firm* — William D. Doyle

(57) ABSTRACT

Cyclic prefix (CP) detection and removal in a wireless communications system (WCS) is disclosed. More specifically, embodiments disclosed herein relate to removing a CP(s) from a random-access symbol(s) in an open radio access network (O-RAN) communications system in the WCS. The random-access symbol(s) includes the CP followed by a random-access sequence. As such, the CP must be removed before the random-access sequence can be detected and processed. In this regard, in embodiments disclosed herein, the O-RAN communications system is configured to determine a group delay associated with the random-access symbol(s) to thereby accurately determine a start of the CP in the random-access symbol(s). Accordingly, the O-RAN communications system can detect and remove the CP from the random-access symbol(s) based on the determined start of the CP. As a result, it is possible to preserve integrity of the random-access symbol(s) to thereby reduce random-access latency in the WCS.

20 Claims, 11 Drawing Sheets

CYCLIC PREFIX (CP) DETECTION AND REMOVAL IN A WIRELESS COMMUNICATIONS SYSTEM (WCS)

RELATED APPLICATION

The application claims the benefit of U.S. provisional patent application Ser. No. 63/066,537, filed Aug. 17, 2020, the disclosure of which is hereby incorporated herein by reference in its entirety.

BACKGROUND

The disclosure relates generally to detecting and removing cyclic prefix (CP) from a random-access symbol(s) in a wireless communications system (WCS), which can include an open radio access network (O-RAN) based fifth-generation (5G) communications system and/or a distributed communications system (DCS).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be abase station (eNodeB) that includes modem functionality and is configured to distribute communications signal streams 108(1)-108(S) to the wireless client devices 106(1)-106(W) based on communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the WCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous signal beams ("beams") 120(1)-120(N) for the communications signal streams 108(1)-108(S) to serve multiple wireless client devices 106(1)-106(W). For example, the multiple beams 120(1)-120(N) may support multiple-input, multiple-output (MIMO) communications.

The radio node 102 of the WCS 100 in FIG. 1 may be configured to support service providers 104(1)-104(N) that have a different frequency spectrum and do not share the spectrum. Thus, in this instance, the communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e., shared) between the multiple service providers 104(1)-104(N) for providing services to the subscribers.

When any of the wireless client devices 106(1)-106(W) first enters, wakes up from sleep mode, and/or losses uplink timing synchronization in the coverage cell of the radio node 102, the wireless client device must acquire/reacquire timing synchronization with the radio node 102. Specifically, the wireless client device transmits a random-access symbol(s) on a physical random-access channel (PRACH) to the radio node 102. As further illustrated in FIG. 2A below, the random-access symbol(s) includes a cyclic prefix (CP) followed by a random-access sequence and a guard time (GT). The CP is provided in the random-access symbol(s) to mitigate inter-symbol interference (ISI) and to account for propagation delay between the wireless client device and the radio node 102.

The radio node 102, upon receiving the random-access symbol(s), detects the random-access preamble(s) based on a fixed detection window that begins at a start of the CP. Accordingly, the radio node 102 can remove the CP from the random-access symbol(s) to extract the random-access sequence. Subsequently, the radio node 102 can provide timing synchronization information to the wireless client device. Understandably, when the propagation delay between the wireless client device and the radio node 102 falls within the fixed detection window, the CP can be removed properly. In contrast, when the wireless client device is located at an edge of the coverage cell of the radio node 102, for example, the random-access symbol(s) may experience a phase shift and thus fall, at least partially, outside the fixed detection window. As a result, the radio node 102 may not be able to correctly detect and remove the CP based on the fixed detection window.

Although the duration of the CP can be adjusted according to a maximum delay spread (e.g., the longest propagation delay in the coverage cell), the CP duration is typically configured to be longer than the GT duration, particularly in 5G new radio (5G-NR) communications systems. Further, the CP duration is typically standardized in, for example, third-generation partnership project (3GPP) standards for the sake of interoperability. As such, it is desirable to accurately determine the start of the CP in the random-access symbol(s) to help reduce access latency in the coverage cell of the radio node 102.

No admission is made that any reference cited herein constitutes prior art. Applicant expressly reserves the right to challenge the accuracy and pertinency of any cited documents.

SUMMARY

Embodiments disclosed herein include cyclic prefix (CP) detection and removal in a wireless communications system (WCS). More specifically, embodiments disclosed herein relate to removing a CP(s) from a random-access symbol(s) in an open radio access network (O-RAN) communications system in the WCS. The random-access symbol(s) includes the CP followed by a random-access sequence. As such, the CP must be removed before the random-access sequence can be detected and processed. In contrast to conventional cellular and small cell systems, where the CP is removed at an antenna port of a base station, the O-RAN communications system (e.g., operating based on O-RAN 7.2 split) requires the CP be removed at an open fronthaul gateway (OFG) separated from the antenna port. As such, it is necessary to take into consideration a group delay associated with the random-access symbol(s) to accurately detect and remove the CP from the random-access symbol(s).

In this regard, in embodiments disclosed herein, the OFG is configured to determine the group delay associated with the random-access symbol(s) to thereby accurately determine a start of the CP in the random-access symbol(s). Accordingly, the OFG can detect and remove the CP from the random-access symbol(s) based on the determined start of the CP. As a result, it is possible to preserve the integrity of the random-access symbol(s) to thereby reduce random-access latency in the WCS.

One exemplary embodiment of the disclosure relates to a radio access network (RAN) communications system. The RAN communications system includes a remote radio circuit comprising at least one antenna port coupled to at least one antenna to receive at least one random-access symbol comprising a CP followed by a random-access sequence. The RAN communications system also includes an OFG circuit coupled to the remote radio circuit. The OFG circuit includes a networking port coupled to a distribution unit (DU). The OFG circuit also includes a processing circuit. The processing circuit is configured to determine a group delay between the at least one antenna port and the networking port. The processing circuit is also configured to determine a start of the CP in the at least one random-access symbol based on the determined group delay. The processing circuit is also configured to remove the CP from the at least one random-access symbol based on the determined start of the CP.

An additional exemplary embodiment of the disclosure relates to a method for detecting and removing a CP in a WCS. The method includes receiving at least one random-access symbol comprising the CP followed by a random-access sequence. The method also includes determining a group delay associated with the at least one random-access symbol. The method also includes determining a start of the CP in the at least one random-access symbol based on the determined group delay. The method also includes removing the CP from the at least one random-access symbol based on the determined start of the CP.

An additional exemplary embodiment of the disclosure relates to a WCS. The WCS includes a RAN communications system. The RAN communications system includes a DU. The RAN communications system also includes a remote radio circuit. The remote radio circuit includes at least one antenna port coupled to at least one antenna to receive at least one random-access symbol comprising a CP followed by a random-access sequence. The RAN communications system also includes an OFG circuit coupled to the remote radio circuit. The OFG circuit includes a networking port coupled to the DU. The OFG circuit also includes a processing circuit. The processing circuit is configured to determine a group delay between the at least one antenna port and the networking port. The processing circuit is also configured to determine a start of the CP in the at least one random-access symbol based on the determined group delay. The processing circuit is also configured to remove the CP from the at least one random-access symbol based on the determined start of the CP. The processing circuit is also configured to communicate the random-access sequence in the at least one random-access symbol to the DU via the networking port.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include cyclic prefix (CP) detection and removal in a wireless communications system (WCS). More specifically, embodiments disclosed herein relate to removing a CP(s) from a random-access symbol(s) in an open radio access network (O-RAN) communications system in the WCS. The random-access symbol(s) includes the CP followed by a random-access sequence. As such, the CP must be removed before the random-access sequence can be detected and processed. In contrast to conventional cellular and small cell systems, where the CP is removed at an antenna port of a base station, the O-RAN communications system (e.g., operating based on O-RAN 7.2 split) requires the CP be removed at an open fronthaul gateway (OFG) separated from the antenna port. As such, it is necessary to take into consideration a group delay associated with the random-access symbol(s) to accurately detect and remove the CP from the random-access symbol(s).

In this regard, in embodiments disclosed herein, the OFG is configured to determine the group delay associated with the random-access symbol(s) to thereby accurately determine a start of the CP in the random-access symbol(s). Accordingly, the OFG can detect and remove the CP from the random-access symbol(s) based on the determined start of the CP. As a result, it is possible to preserve integrity of the random-access symbol(s) to thereby reduce random-access latency in the WCS.

Figure 1:
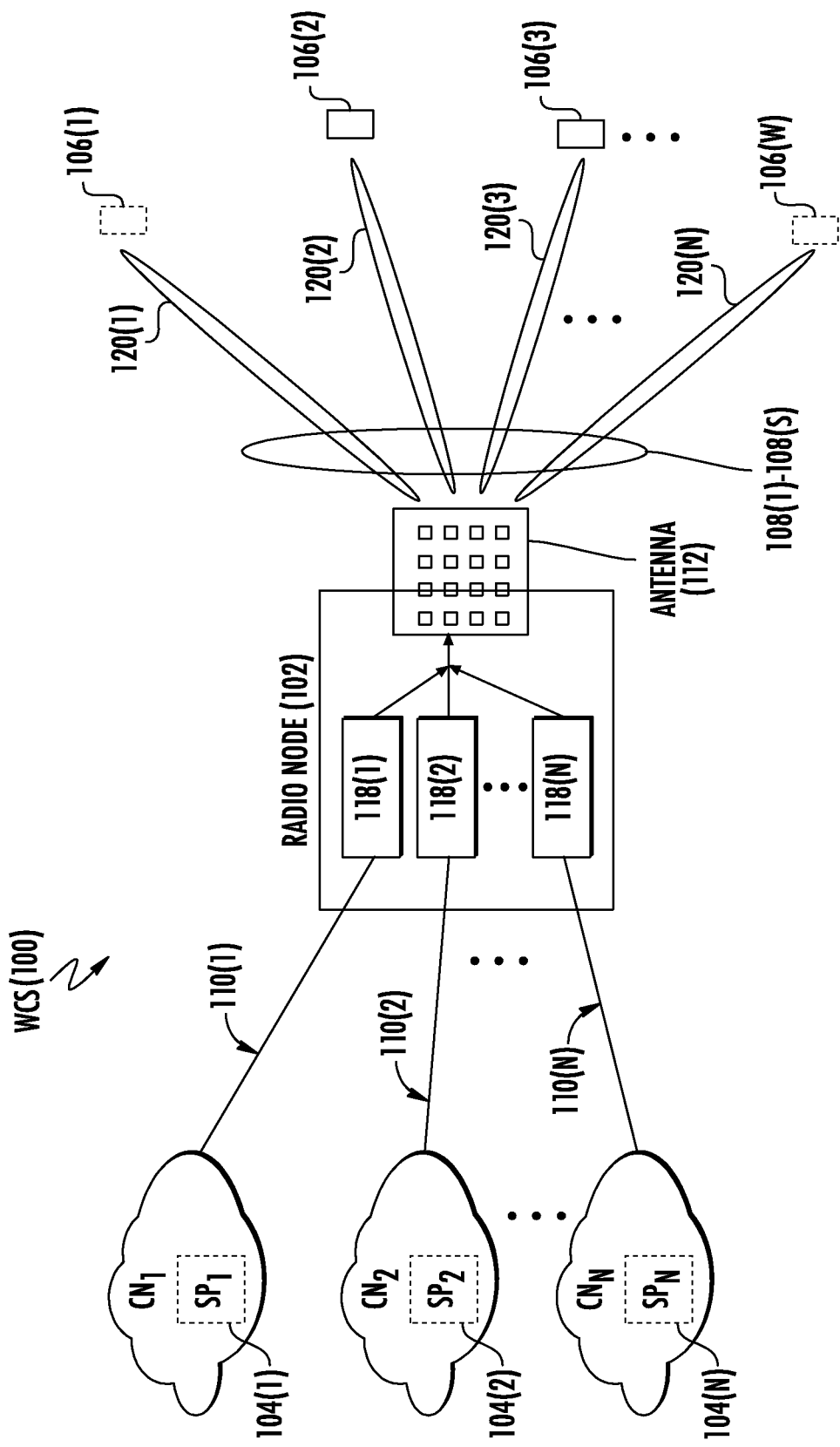
FIG. 1 is a schematic diagram of an exemplary wireless communications system (WCS), such as a distributed communications system (DCS), configured to distribute communications services to remote coverage areas.
Figure 2A:
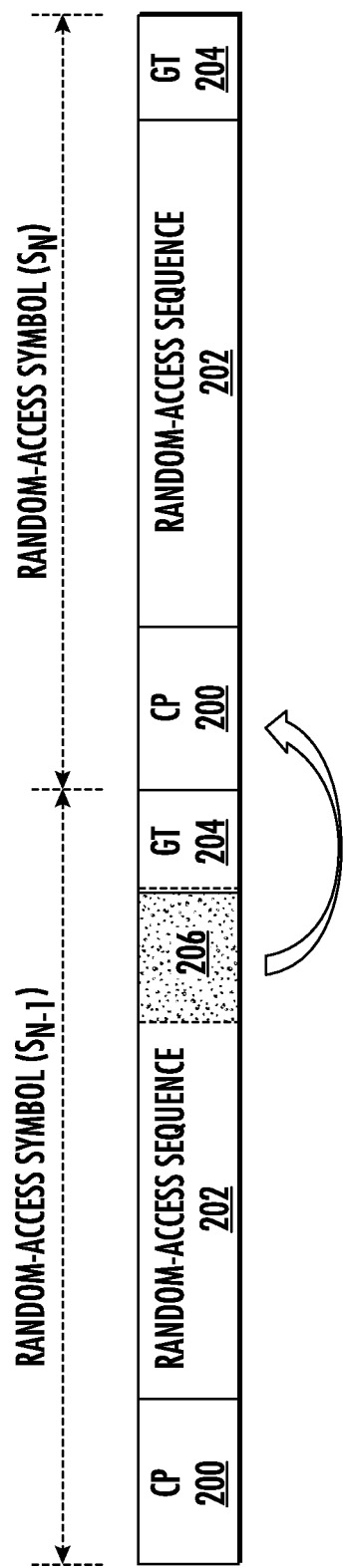
FIG. 2A is schematic diagram of an exemplary random-access symbol(s) that includes a cyclic prefix (CP)
Figure 2B:
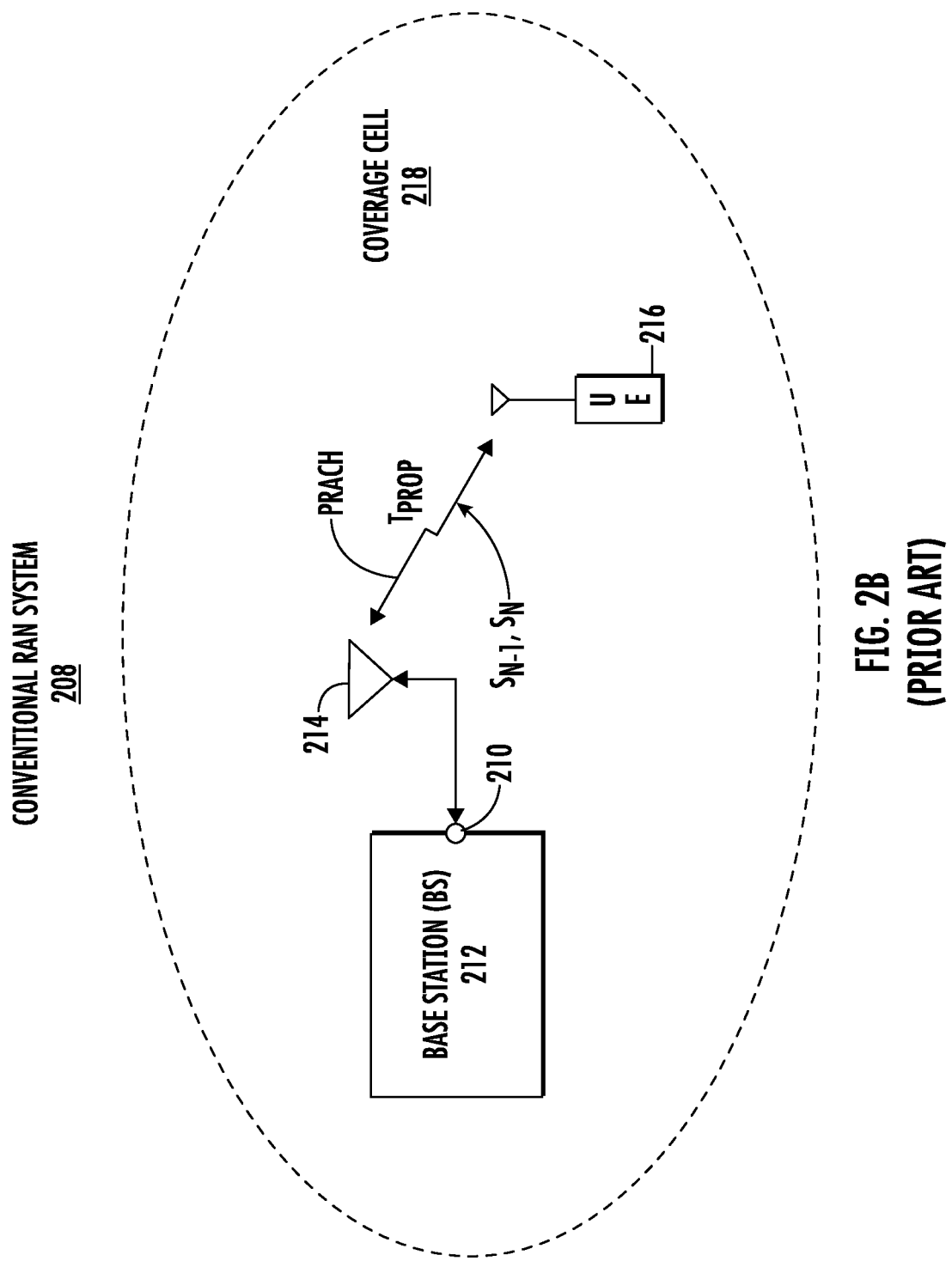
FIG. 2B is a schematic diagram of a conventional radio access network (RAN) system where CP removal is performed at an antenna port of a base station.
Figure 2C:
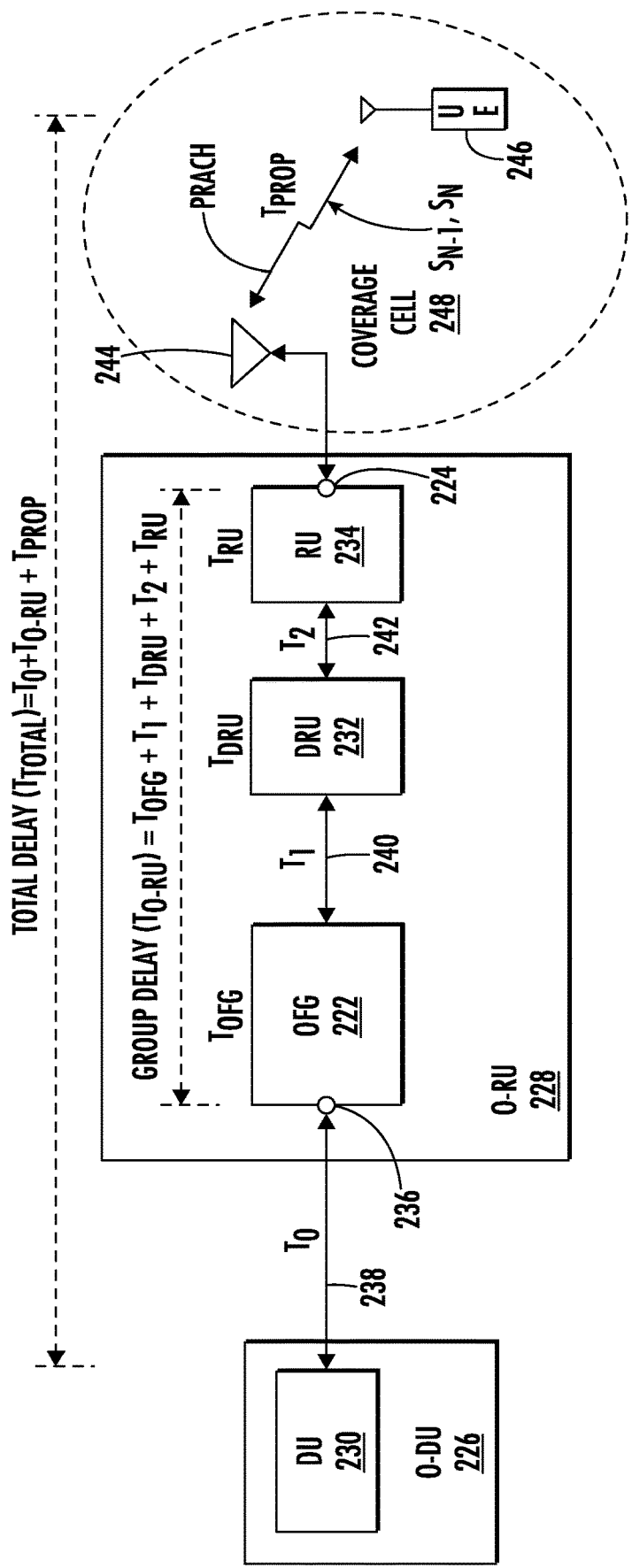
FIG. 2C is a schematic diagram of a conventional open RAN (O-RAN) system where CP removal is performed at an open fronthaul gateway (OFG) separated from an antenna port.
Figure 2D:
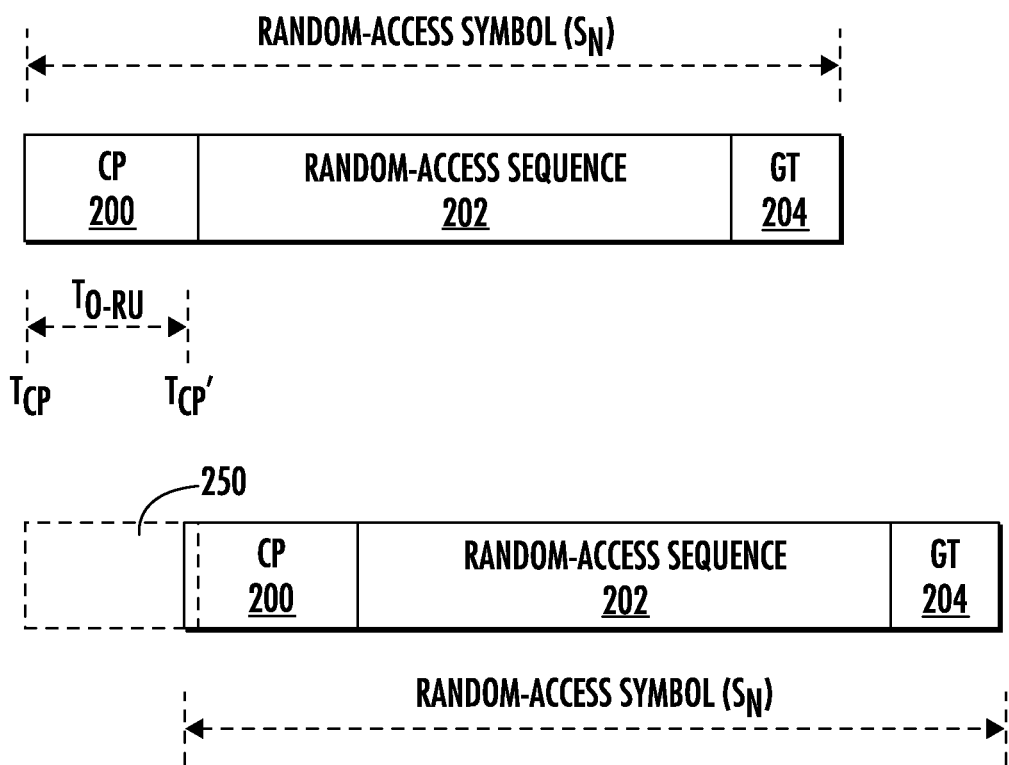
FIG. 2D is a schematic diagram providing an exemplary illustration of wrongful CP removal that may occur in the conventional O-RAN system of FIG. 2C.
Figure 3:
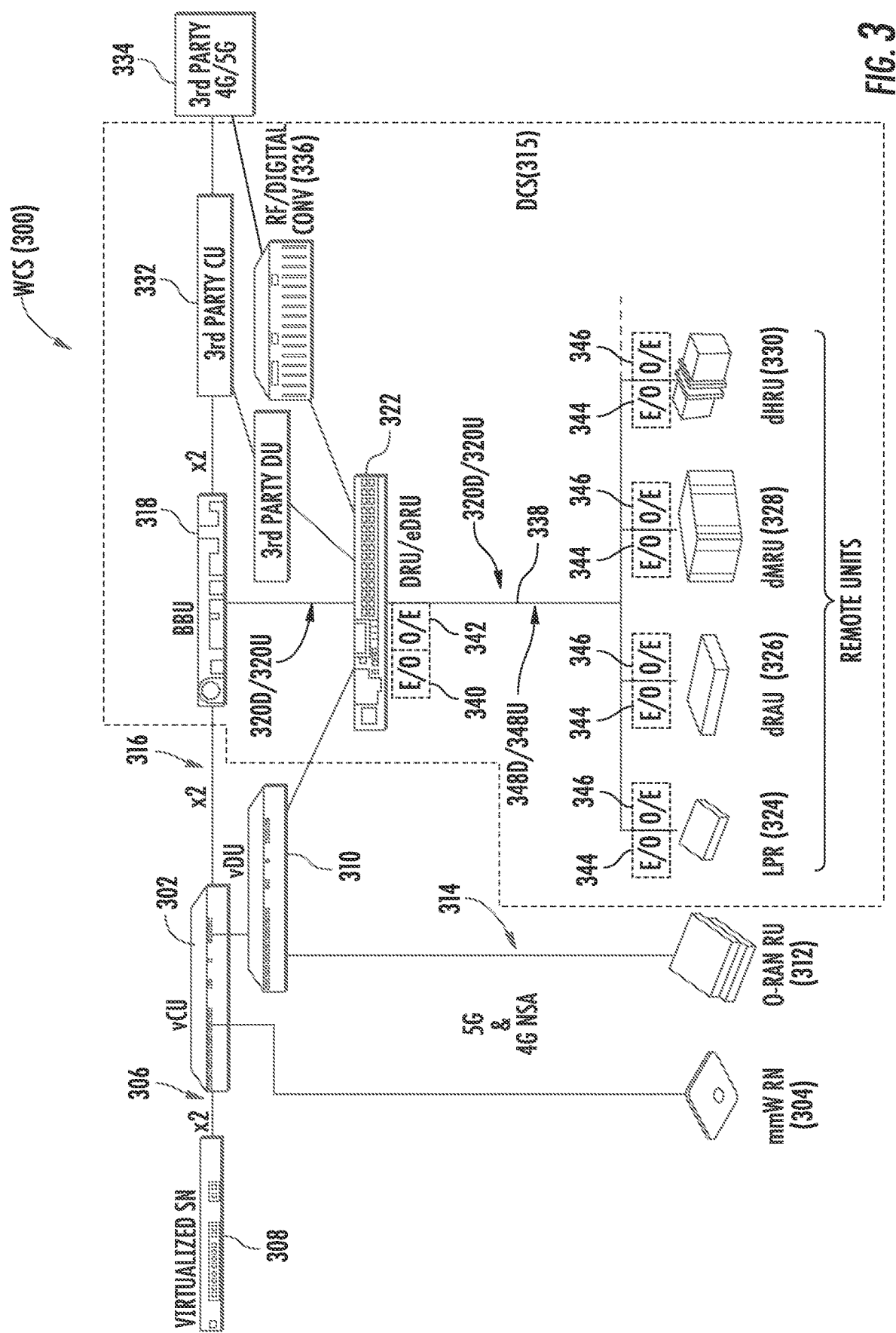
FIG. 3 is a schematic diagram of an exemplary WCS configured according to any of the embodiments disclosed herein to accurately detect and remove the CP from the random-access symbols of FIG. 2A.

Before discussing CP removal from a random-access symbol(s) in a WCS according to the present disclosure, starting at FIG. 3, an overview of a random-access symbol(s) and conventional methods for removing the CP from the random-access symbol(s) is first provided with reference to FIGS. 2A-2D. Common elements between FIGS. 2A-2D are shown therein with common element numbers and will not be re-described herein.

In this regard, FIG. 2A is schematic diagram providing an exemplary illustration of a pair of consecutive random-access symbols $S_{N-1}$ and $S_N$. As shown in FIG. 2A, each of the random-access symbols $S_{N-1}$ and $S_N$ includes a CP 200 that proceeds a random-access sequence 202 (a.k.a. "preamble sequence") and a guard time (GT) 204. Typically, the CP 200 in the random-access symbol $S_N$ is generated by copying a tail section 206 of the random-access symbol $S_{N-1}$ that proceeds the random-access symbol $S_N$. The duration and format of the CP 200, the random-access sequence 202, and the GT 204 are typically standardized, for example by third-generation partnership project (3GPP), to ensure interoperability. Understandably, to process the random-access sequence 202 in each of the random-access symbols $S_{N-1}$ and $S_N$, it is necessary to first remove the CP 200 from the random-access symbols $S_{N-1}$ and $S_N$. As discussed below in FIGS. 2B-2D, removal of the CP 200 from the random-access symbols $S_{N-1}$ and $S_N$ are handled differently in different radio access network (RAN) systems.

FIG. 2B is a schematic diagram of a conventional RAN system 208 (e.g., a cellular system or a small cell system) where CP removal is performed at an antenna port 210 of a base station 212. The antenna port 210 is coupled to an antenna 214 to provide a physical random-access channel (PRACH), whereby a user equipment (UE) 216 can transmit the random-access symbols $S_{N-1}$ and $S_N$ to acquire/reacquire timing synchronization with the base station 212 (e.g., when first entering, waking up from sleep mode, and/or losing timing synchronization) in a coverage cell 218. The base station 212, upon receiving the random-access symbols $S_{N-1}$ and $S_N$ at the antenna port 210, removes the CP 200 from the random-access symbols $S_{N-1}$ and $S_N$ to thereby detect and process the random-access sequence 202 in the random-access symbols $S_{N-1}$ and $S_N$. Given that the CP 200 is removed at the antenna port 210, the random-access symbols $S_{N-1}$ and $S_N$ only experience a propagation delay $T_{PR}OP$ between the UE 216 and the antenna port 210, which is typically accounted for by the duration of the CP 200. As such, the base station 212 can accurately determine and remove the CP 200 based on a fixed detection window.

FIG. 2C is a schematic diagram of a conventional O-RAN system 220 where CP removal is performed at an OFG 222 separated from an antenna port 224. The conventional O-RAN system 220 includes an O-RAN distribution unit (DU) (O-DU) 226 and an O-RAN remote unit (RU) (O-RU) 228. The conventional O-RAN system 220 is configured to operate based on O-RAN 7.2 split. Hereinafter, O-RAN 7.2 split refers to an O-RAN system wherein a medium access control (MAC) layer of the RAN system resides in a DU (e.g., the O-DU 226) and a physical (PHY) of the RAN system resides in an RU (e.g., the O-RU 228).

The O-DU 226 includes a DU 230. The O-RU 228 includes the OFG 222, a digital routing unit (DRU) 232, and an RU 234. The OFG 222 includes an Ethernet port 236 that is coupled to the DU 230 via a first communication link 238. The OFG 222 is coupled to the DRU 232 via a second communication link 240. The DRU 232 is coupled to the RU 234 via a third communication link 242. The RU 234 includes the antenna port 224, which is coupled to an antenna 244 to provide the PRACH whereby a UE 246 can transmit the random-access symbols $S_{N-1}$ and $S_N$ to acquire/reacquire timing synchronization in a coverage cell 248.

In contrast to the conventional RAN system 208 of FIG. 2B, the conventional O-RAN system 220 requires that the CP 200 be removed at the Ethernet port 236, as opposed to being removed at the antenna port 224. After removing the CP 200, the OFG 222 is further required to communicate the random-access sequence 202 to the DU 230 via the Ethernet port 236. As such, each of the random-access symbols $S_{N-1}$ and $S_N$ would experience a group delay $T_{O-RU}$ when arriving at the Ethernet port 236. Herein, a group delay refers generally to an actual transit time of a signal (e.g., the random-access symbols $S_{N-1}$ and $S_N$) through a device (e.g., O-RU 228) as a function of frequency. In a non-limiting example, the group delay $T_{O-RU}$ can be determined based on equation (Eq. 1) below.

$$T_{O-RU} = T_{OFG} + T_1 + T_{DRU} + T_2 + T_{RU} \quad \text{(Eq. 1)}$$

In the equation (Eq. 1) above, $T_{OFG}$ represents a processing delay at the OFG 222, $T_{DRU}$ represents a processing delay at the DRU 232, $T_{RU}$ represents a processing delay at the RU 234, $T_1$ represents a propagation delay over the second communication link 240, and $T_2$ represents a propagation delay over the third communication link 242. If the group delay $T_{O-RU}$ is not accounted for when the OFG 222 attempts to remove the CP 200 from the random-access symbols $S_{N-1}$ and $S_N$, the OFG 222 may remove the wrong information from the random-access symbols $S_{N-1}$ and $S_N$, thus risking data integrity of the random-access symbols $S_{N-1}$ and $S_N$.

In this regard, FIG. 2D is a schematic diagram providing an exemplary illustration of wrongful CP removal that may occur in the conventional O-RAN system 220 of FIG. 2C. As shown in FIG. 2D, if the random-access symbol $S_N$ has not experienced the group delay $T_{O-RU}$, the CP 200 will start at time $T_{CP}$. However, the random-access symbol $S_N$ actually starts at time $T_{CP'}$ as a result of the group delay $T_{O-RU}$. In this regard, if the OFG 222 does not take into consideration the group delay $T_{O-RU}$ and attempts to remove the CP 200 at time $T_{CP}$, the OFG 222 may wrongfully remove a section 250. As a result, the OFG 222 may instead provide corrupted random-access information to the DU 230.

On the other hand, the DU 230 will experience a total delay $T_{TOTAL}$ in receiving the corrupted random-access information. In a non-limiting example, the total delay $T_{TOTAL}$ can be determined based on equation (Eq. 2) below.

$$T_{TOTAL} = T_0 + T_{O-RU} + T_{PROP} \quad \text{(Eq. 2)}$$

In the equation (Eq. 2) above, $T_0$ represents a propagation delay over the first communication link 238 and $T_{PROP}$ represents a propagation delay from the UE 246 to the antenna port 224. The total delay $T_{TOTAL}$ may cause the DU 230 to wrongfully assume that the UE 246 is located farther away from the antenna port 224. As a result, the DU 230 may determine improper timing advance (TA) and/or radio resources for the UE 246, thus compromising performance (e.g., data throughput) in the coverage cell 248. Hence, it is desirable to perform accurate CP removal by taking into consideration the group delay $T_{O-RU}$.

In this regard, FIG. 3 is a schematic diagram of an exemplary WCS 300 configured according to any of the embodiments disclosed herein to accurately detect and remove the CP 200 from the random-access symbols $S_{N-1}$ and $S_N$ of FIG. 2A. The WCS 300 supports both legacy 4G LTE, 4G/5G non-standalone (NSA), and 5G standalone communications systems. As shown in FIG. 3, a centralized services node 302 is provided and configured to interface with a core network to exchange communications data and distribute the communications data as radio signals to remote units. In this example, the centralized services node 302 is configured to support distributed communications services to an mmWave radio node 304. Despite that only one of the mmWave radio node 304 is shown in FIG. 3, it should be appreciated that the WCS 300 can be configured to include additional numbers of the mmWave radio node 304, as needed. The functions of the centralized services node 302 can be virtualized through an x2 interface 306 to another services node 308. The centralized services node 302 can also include one or more internal radio nodes that are configured to be interfaced with a DU 310 to distribute communications signals to one or more O-RAN RUs 312 that are configured to be communicatively coupled through an O-RAN interface 314 (e.g., an Ethernet interface). The O-RAN RUs 312 are each configured to communicate downlink and uplink communications signals in a respective coverage cell.

The centralized services node 302 can also be interfaced with a distributed communications system (DCS) 315 through an x2 interface 316. Specifically, the centralized services node 302 can be interfaced with a digital baseband unit (BBU) 318 that can provide a digital signal source to the centralized services node 302. The digital BBU 318 may be configured to provide a signal source to the centralized services node 302 to provide downlink communications signals 320D to a DRU 322 as part of a digital distributed antenna system (DAS). The DRU 322 is configured to split and distribute the downlink communications signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communications signals 320U received from the LPR 324, the dRAU 326, the dMRU 328, and the dHRU 330 and provide the combined uplink communications signals to the digital BBU 318. The digital BBU 318 is also configured to interface with a third-party central unit 332 and/or an analog source 334 through a radio frequency (RF)/digital converter 336.

The DRU 322 may be coupled to the LPR 324, the dRAU 326, the dMRU 328, and the dHRU 330 via an optical fiber-based communications medium 338. In this regard, the DRU 322 can include a respective electrical-to-optical (E/O) converter 340 and a respective optical-to-electrical (O/E) converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communications signals 320D into downlink optical communications signals 348D for distribution to the LPR 324, the dRAU 326, the dMRU 328, and the dHRU 330 via the optical fiber-based communications medium 338. The O/E converter 346 at each of the LPR 324, the dRAU 326, the dMRU 328, and the dHRU 330 is configured to convert the downlink optical communications signals 348D back to the downlink communications signals 320D. The E/O converter 344 at each of the LPR 324, the dRAU 326, the dMRU 328, and the dHRU 330 is configured to convert the uplink communications signals 320U into uplink optical communications signals 348U. The O/E converter 342 at the DRU 322 is configured to convert the uplink optical communications signals 348U back to the uplink communications signals 320U.

In a non-limiting example, the DU 310 can be functionally equivalent to the O-DU 226 in FIG. 2C and the O-RAN RU 312 can be functionally equivalent to the O-RU 228 in FIG. 2C. As such, the DU 310 and the O-RAN RU 312 can be configured to operate based on the O-RAN 7.2 split. Accordingly, the O-RAN RU 312 is configured to detect and remove the CP 200 from the random-access symbols $S_{N-1}$ and $S_N$ and then provide the random-access sequence 202 to the DU 310 via the O-RAN interface 314.

In contrast to the conventional O-RAN system 220 of FIG. 2C, the O-RAN RU 312 is configured to take into consideration the group delay $T_{O-RU}$ when detecting and removing the CP 200 from any of the random-access symbols $S_{N-1}$ and $S_N$. As such, the O-RAN RU 312 can avoid the wrongful CP removal situation as illustrated in FIG. 2D, thus helping to preserve integrity of the random-access symbols $S_{N-1}$ and $S_N$ to thereby reduce random-access latency in the WCS 300.

Figure 4:
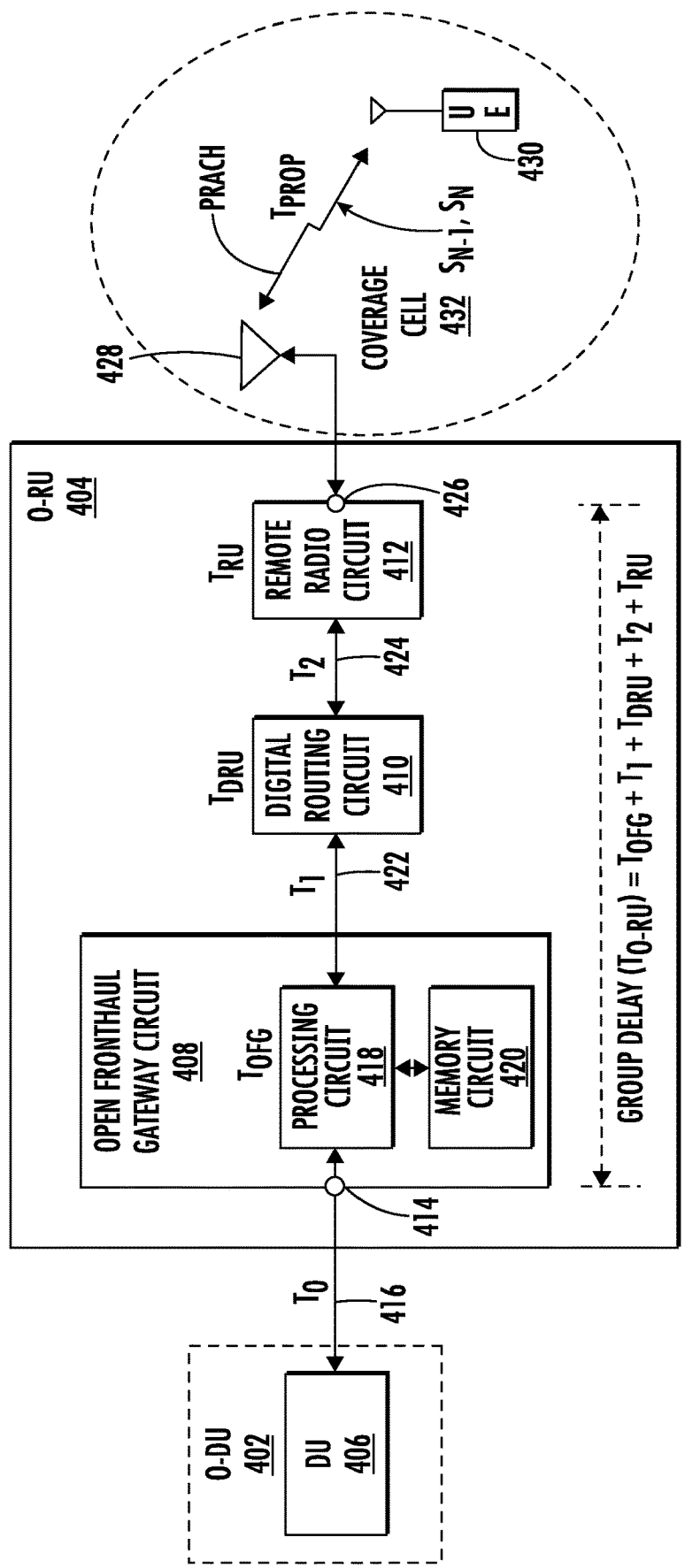
FIG. 4 is a schematic diagram of an exemplary O-RAN communications system, which can be provided in the WCS of FIG. 3 and configured to accurately detect and remove the CP from the random-access symbol(s) in FIG. 2A by taking into account a group delay associated with the random-access symbol(s)

In this regard, FIG. 4 is a schematic diagram of an exemplary O-RAN communications system 400, which can be provided in the WCS 300 of FIG. 3 and configured to accurately detect and remove the CP 200 from the random-access symbols $S_{N-1}$ and $S_N$ in FIG. 2A by taking into account the group delay $T_{O-RU}$ associated with the random-access symbols $S_{N-1}$ and $S_N$.

The O-RAN communications system 400 includes an O-DU 402 and an O-RU 404. Similar to the conventional O-RAN system 220 of FIG. 2C, the O-RAN communications system 400 is also configured to operate based on the O-RAN 7.2 split. Accordingly, the O-DU 402 is configured to implement the MAC layer and the O-RU 404 is configured to implement the PHY layer.

The O-DU 402 includes a DU 406. The O-RU 404 includes an OFG circuit 408, a digital routing circuit 410, and a remote radio circuit 412, which is functionally equivalent to the DU 230 in FIG. 2C. The O-RU 404 includes an OFG circuit 408, a digital routing circuit 410, and a remote radio circuit 412. In a non-limiting example, the OFG circuit 408, the digital routing circuit 410, and the remote radio circuit 412 are functionally equivalent to the OFG 222, the DRU 232, and the RU 234 in FIG. 2C, respectively. However, the OFG circuit 408 differs from the OFG 222 in that the OFG circuit 408 is configured according to embodiments of the present disclosure to accurately detect and remove the CP 200 from the random-access symbols $S_{N-1}$ and $S_N$ in FIG. 2A by taking into account the group delay $T_{O-RU}$ associated with the random-access symbols $S_{N-1}$ and $S_N$.

The OFG circuit 408 includes a networking port 414 that is coupled to the DU 406 via a first communication link 416. In a non-limiting example, the OFG circuit 408 includes a processing circuit 418 and a memory circuit 420, which can include such memory devices as random-access memory (RAM), read-only memory (ROM), flash memory, solid-state device (SSD), and so on. The processing circuit 418, which can be a field-programmable gate array (FPGA), a general-purpose processor, or an application-specific integrated circuit (ASIC), as an example, is coupled to the digital routing circuit 410 via a second communication link 422. The digital routing circuit 410 is coupled to the remote radio circuit 412 via a third communication link 424. The remote radio circuit 412 includes at least one antenna port 426, which is coupled to at least one antenna 428 to provide a PRACH whereby a UE 430 can transmit the random-access symbols $S_{N-1}$ and $S_N$ to acquire/reacquire timing synchronization in a coverage cell 432.

Notably, each of the random-access symbols $S_{N-1}$ and $S_N$ received at the antenna port 426 will arrive at the networking port 414 through the remote radio circuit 412, the third communication link 424, the digital routing circuit 410, the second communication link 422, and the processing circuit 418. As such, each of the random-access symbols $S_{N-1}$ and $S_N$ will be associated with the group delay $T_{O-RU}$, as shown below in equation (Eq. 3) when arriving at the networking port 414.

$$T_{O-RU} = T_{OFG} + T_1 + T_{DRU} + T_2 + T_{RU} \quad \text{(Eq. 3)}$$

In the equation (Eq. 3) above, $T_{OFG}$ represents a processing delay at the OFG circuit 408, $T_{DRU}$ represents a processing delay at the digital routing circuit 410, $T_{RU}$ represents a processing delay at the remote radio circuit 412, $T_1$ represents a propagation delay over the second communication link 422, and $T_2$ represents a propagation delay over the third communication link 424.

According to embodiments disclosed herein, the processing circuit 418 is configured to determine the group delay $T_{O-RU}$ between the antenna port 426 and the networking port 414. The processing circuit 418 can then determine a start of the CP 200 in any of the random-access symbols $S_{N-1}$ and $S_N$ based on the determined group delay $T_{O-RU}$. Accordingly, the processing circuit 418 can remove the CP 200 based on the determined start of the CP 200. By detecting the start of the CP based on the determined group delay $T_{O-RU}$, the processing circuit 418 can avoid the wrongful CP removal situation as illustrated in FIG. 2D, thus helping to preserve the integrity of the random-access symbols $S_{N-1}$ and $S_N$ to thereby reduce random-access latency in the WCS 300.

Figure 5:
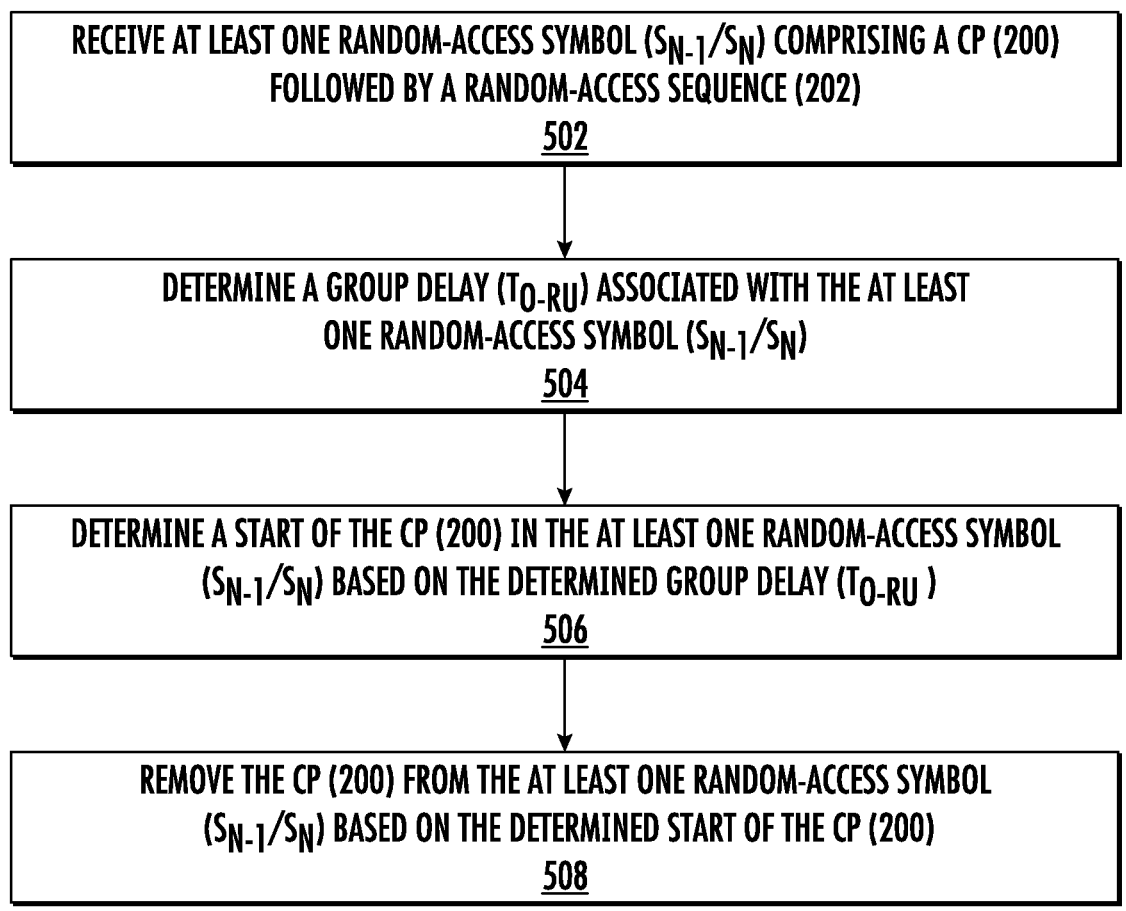
FIG. 5 is a flowchart of an exemplary process that can be employed by the O-RAN communications system of FIG. 4 to accurately detect and remove the CP from the random-access symbol(s)

The processing circuit 418 may be configured to detect and remove the CP 200 from any of the random-access symbols $S_{N-1}$ and $S_N$ based on a process. In this regard, FIG. 5 is a flowchart of an exemplary process 500 that can be employed by the processing circuit 418 in the O-RAN communications system 400 of FIG. 4 to accurately detect and remove the CP 200 from any of the random-access symbols $S_{N-1}$ and $S_N$.

According to the process 500, the processing circuit 418 receives any of the random-access symbols $S_{N-1}$ and $S_N$, which includes the CP 200 followed by the random-access sequence 202 (block 502). The processing circuit 418 determines the group delay $T_{O-RU}$ associated with any of the random-access symbols $S_{N-1}$ and $S_N$ (block 504). The processing circuit 418 then determines a start of the CP 200 in any of the random-access symbols $S_{N-1}$ and $S_N$ based on the determined group delay $T_{O-RU}$ (block 506). Accordingly, the processing circuit 418 removes the CP 200 from any of the random-access symbols $S_{N-1}$ and $S_N$ based on the determined start of the CP 200 (block 508).

With reference back to FIG. 4, in a non-limiting example, to determine the group delay $T_{O-RU}$, the processing circuit 418 can send a test packet with a known pattern toward the remote radio circuit 412. The remote radio circuit 412 may be configured to immediately return the test packet. Accordingly, the processing circuit 418 can measure a round-trip delay upon receiving the test packet returned by the remote radio circuit 412. In this regard, the processing circuit 418 can determine the first propagation delay $T_1$, the second processing delay $T_{DRU}$, and the second propagation delay $T_2$ to be equal to one-half of the measured round-trip delay. To further account for the first processing delay $T_{OFG}$ and the third processing delay $T_{RU}$, the OFG circuit 408 may be configured to pre-store the first processing delay $T_{OFG}$ and the third processing delay $T_{RU}$ in the memory circuit 420.

In a non-limiting example, the O-RU 404 is configured to process the random-access symbols $S_{N-1}$ and $S_N$ as time domain data and provides the random-access sequence 202 to the O-DU 402 as frequency domain data. Herein, time domain data refers to data that changes over time and frequency domain data refers to how well data lies within each given frequency band over a range of frequencies. In this regard, after removing the CP 200, the processing circuit 418 is configured to convert the random-access sequence 202 from a time domain data to a frequency domain data and communicate the frequency domain data to the DU 406 via the networking port 414. Notably, the processing circuit 418 can perform a Fast Fourier Transform (FFT) to convert the random-access sequence 202 from the time domain data into the frequency domain data.

In an embodiment, the networking port 414 can be an Ethernet port. In this regard, the processing circuit 418 can be further configured to encode the frequency domain data-based on a common public radio interface (CPRI) protocol for communication via the Ethernet port in Ethernet packets.

Figure 6:
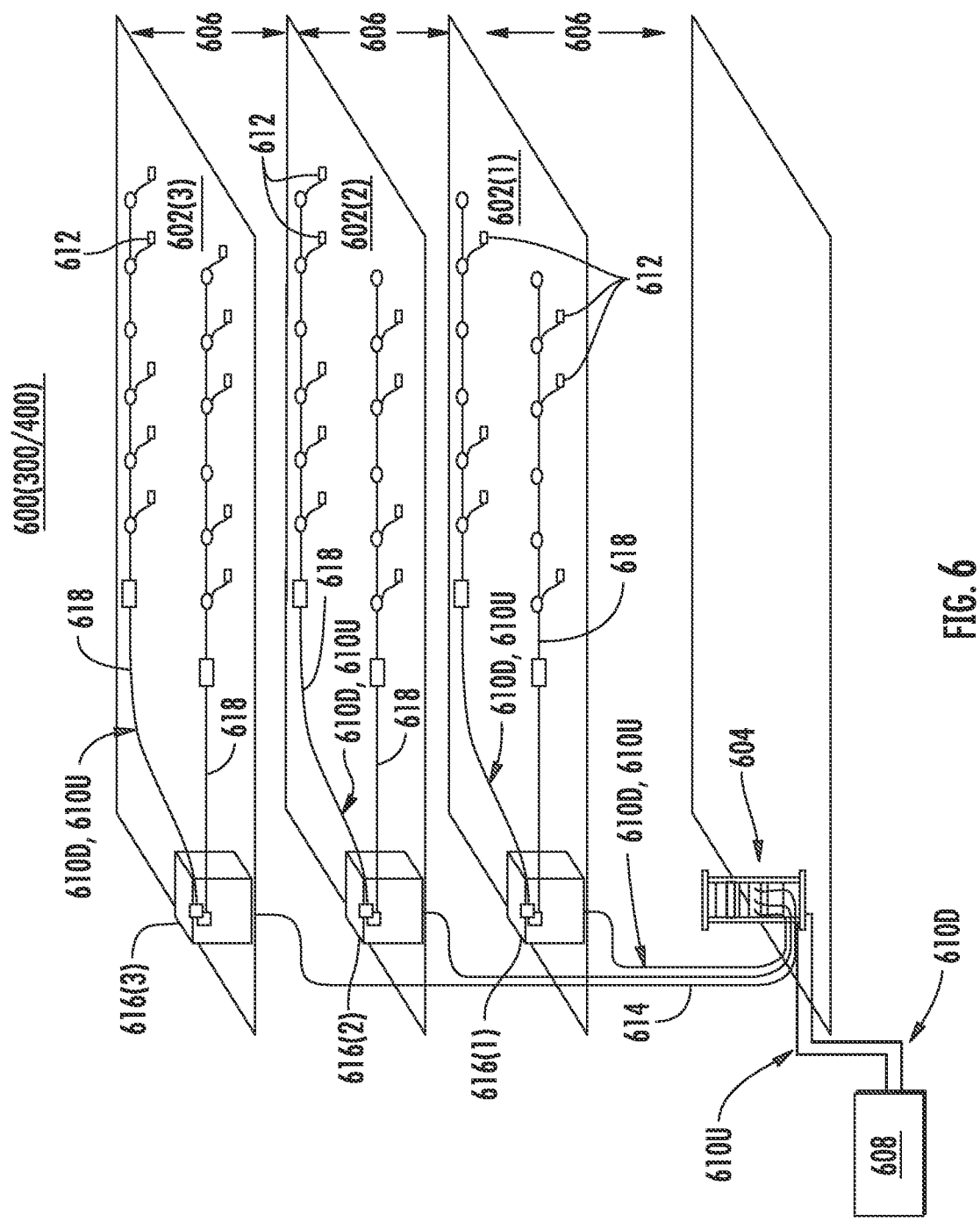
FIG. 6 is a partial schematic cut-away diagram of an exemplary building infrastructure in a WCS, such as the WCS of FIG. 3 that includes the O-RAN communications system of FIG. 4 to detect and remove the CP from the random-access symbol(s)

The WCS 300 of FIG. 3, which can include the O-RAN communications system 400 in FIG. 4, can be provided in an indoor environment as illustrated in FIG. 6. FIG. 6 is a partial schematic cut-away diagram of an exemplary building infrastructure 600 in a WCS, such as the WCS 300 of FIG. 3 that includes the O-RAN communications system 400 of FIG. 4. The building infrastructure 600 in this embodiment includes a first (ground) floor 602(1), a second floor 602(2), and a third floor 602(3). The floors 602(1)-602(3) are serviced by a central unit 604 to provide antenna coverage areas 606 in the building infrastructure 600. The central unit 604 is communicatively coupled to a base station 608 to receive downlink communications signals 610D from the base station 608. The central unit 604 is communicatively coupled to a plurality of remote units 612 to distribute the downlink communications signals 610D to the remote units 612 and to receive uplink communications signals 610U from the remote units 612, as previously discussed above. The downlink communications signals 610D and the uplink communications signals 610U communicated between the central unit 604 and the remote units 612 are carried over a riser cable 614. The riser cable 614 may be routed through interconnect units (ICUs) 616(1)-616(3) dedicated to each of the floors 602(1)-602(3) that route the downlink communications signals 610D and the uplink communications signals 610U to the remote units 612 and also provide power to the remote units 612 via array cables 618.

Figure 7:
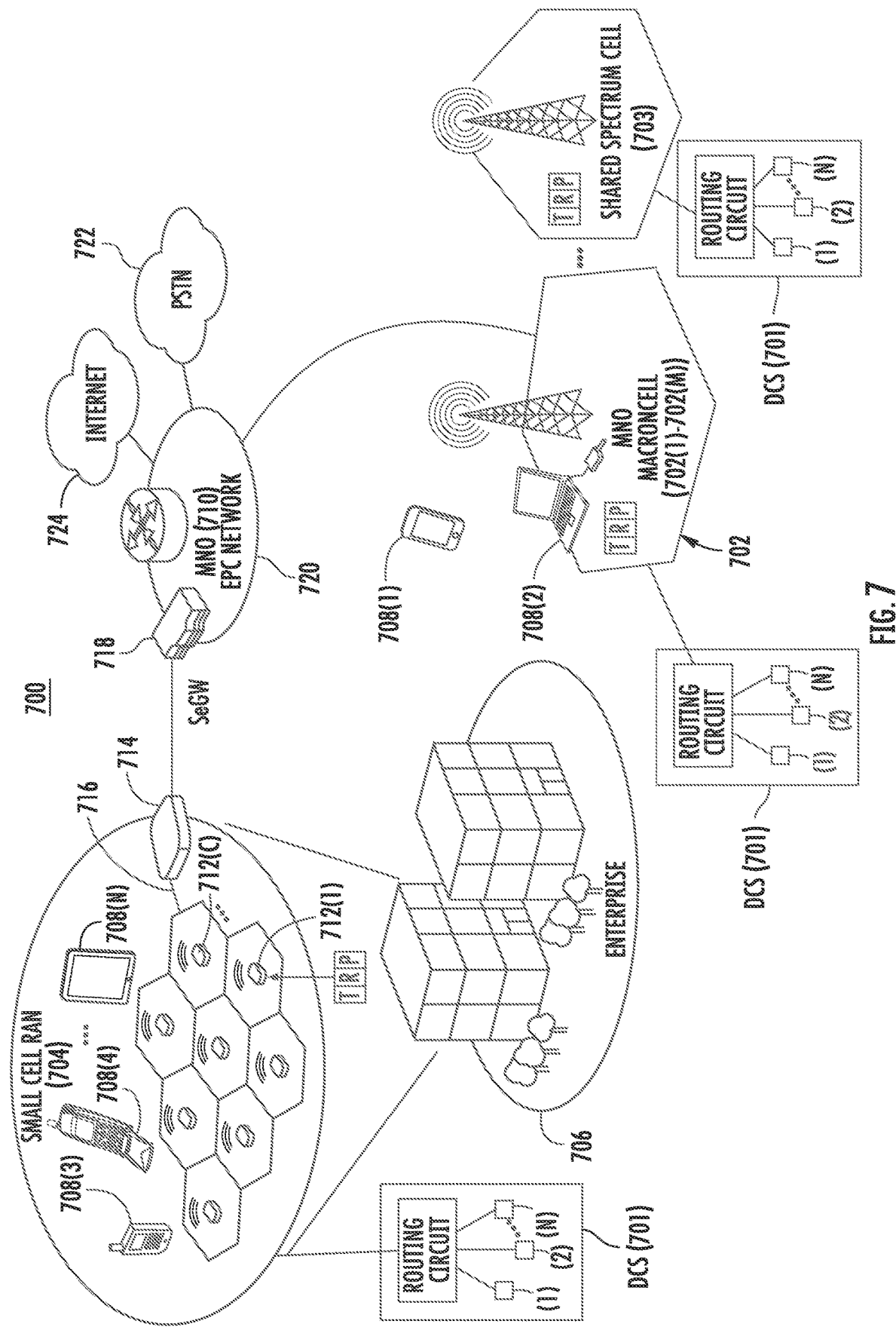
FIG. 7 is a schematic diagram of an exemplary mobile telecommunications environment that can include the WCS of FIG. 3 that includes the O-RAN communications system of FIG. 4 to detect and remove the CP from the random-access symbol(s)

The WCS 300 of FIG. 3 and the O-RAN communications system 400 of FIG. 4 configured to accurately detect and remove the CP 200 from the random-access symbols $S_{N-1}$ and $S_N$ can also be interfaced with different types of radio nodes of service providers and/or supporting service providers, including macrocell systems, small cell systems, and remote radio heads (RRH) systems, as examples. For example, FIG. 7 is a schematic diagram of an exemplary mobile telecommunications environment 700 (also referred to as "environment 700") that includes radio nodes and cells that may support shared spectrum, such as unlicensed spectrum, and can be interfaced to shared spectrum WCSs 701 supporting coordination of distribution of shared spectrum from multiple service providers to remote units to be distributed to subscriber devices. The shared spectrum WCSs 701 can include the WCS 300 of FIG. 3 that includes the O-RAN communications system 400 of FIG. 4, as an example.

The environment 700 includes exemplary macrocell RANs 702(1)-702(M) ("macrocells 702(1)-702(M)") and an exemplary small cell RAN 704 located within an enterprise environment 706 and configured to service mobile communications between a user mobile communications device 708(1)-708(N) to a mobile network operator (MNO) 710. A serving RAN for the user mobile communications devices 708(1)-708(N) is a RAN or cell in the RAN in which the user mobile communications devices 708(1)-708(N) have an established communications session with the exchange of mobile communications signals for mobile communications. Thus, a serving RAN may also be referred to herein as a serving cell. For example, the user mobile communications devices 708(3)-708(N) in FIG. 7 are being serviced by the small cell RAN 704, whereas the user mobile communications devices 708(1) and 708(2) are being serviced by the macrocell 702. The macrocell 702 is an MINO macrocell in this example. However, a shared spectrum RAN 703 (also referred to as "shared spectrum cell 703") includes a macrocell in this example and supports communications on frequencies that are not solely licensed to a particular MNO, such as CBRS for example, and thus may service user mobile communications devices 708(1)-708(N) independent of a particular MNO. For example, the shared spectrum cell 703 may be operated by a third party that is not an MNO and wherein the shared spectrum cell 703 supports CBRS. Also, as shown in FIG. 7, the MNO macrocell 702, the shared spectrum cell 703, and/or the small cell RAN 704 can interface with a shared spectrum WCS 701 supporting coordination of distribution of shared spectrum from multiple service providers to remote units to be distributed to subscriber devices. The MNO macrocell 702, the shared spectrum cell 703, and the small cell RAN 704 may be neighboring radio access systems to each other, meaning that some or all can be in proximity to each other such that a user mobile communications device 708(3)-708(N) may be able to be in communications range of two or more of the MNO macrocell 702, the shared spectrum cell 703, and the small cell RAN 704 depending on the location of the user mobile communications devices 708(3)-708(N).

In FIG. 7, the mobile telecommunications environment 700 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 700 includes the enterprise environment 706 in which the small cell RAN 704 is implemented. The small cell RAN 704 includes a plurality of small cell radio nodes 712(1)-712(C). Each small cell radio node 712(1)-712(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 7, the small cell RAN 704 includes one or more services nodes (represented as a single services node 714) that manage and control the small cell radio nodes 712(1)-712(C). In alternative implementations, the management and control functionality may be incorporated into a radio node, distributed among nodes, or implemented remotely (i.e., using infrastructure external to the small cell RAN 704). The small cell radio nodes 712(1)-712(C) are coupled to the services node 714 over a direct or local area network (LAN) connection 716 as an example, typically using secure IPsec tunnels. The small cell radio nodes 712(1)-712(C) can include multi-operator radio nodes. The services node 714 aggregates voice and data traffic from the small cell radio nodes 712(1)-712(C) and provides connectivity over an IPsec tunnel to a security gateway (SeGW) 718 in a network 720 (e.g., evolved packet core (EPC) network in a 4G network, or 5G Core in a 5G network) of the MNO 710. The network 720 is typically configured to communicate with a public switched telephone network (PSTN) 722 to carry circuit-switched traffic, as well as for communicating with an external packet-switched network such as the Internet 724.

The environment 700 also generally includes a node (e.g., eNodeB or gNodeB) base station, or "macrocell" 702. The radio coverage area of the macrocell 702 is typically much larger than that of a small cell where the extent of coverage often depends on the base station configuration and surrounding geography. Thus, a given user mobile communications device 708(3)-708(N) may achieve connectivity to the network 720 (e.g., EPC network in a 4G network, or 5G Core in a 5G network) through either a macrocell 702 or small cell radio node 712(1)-712(C) in the small cell RAN 704 in the environment 700.

Figure 8:
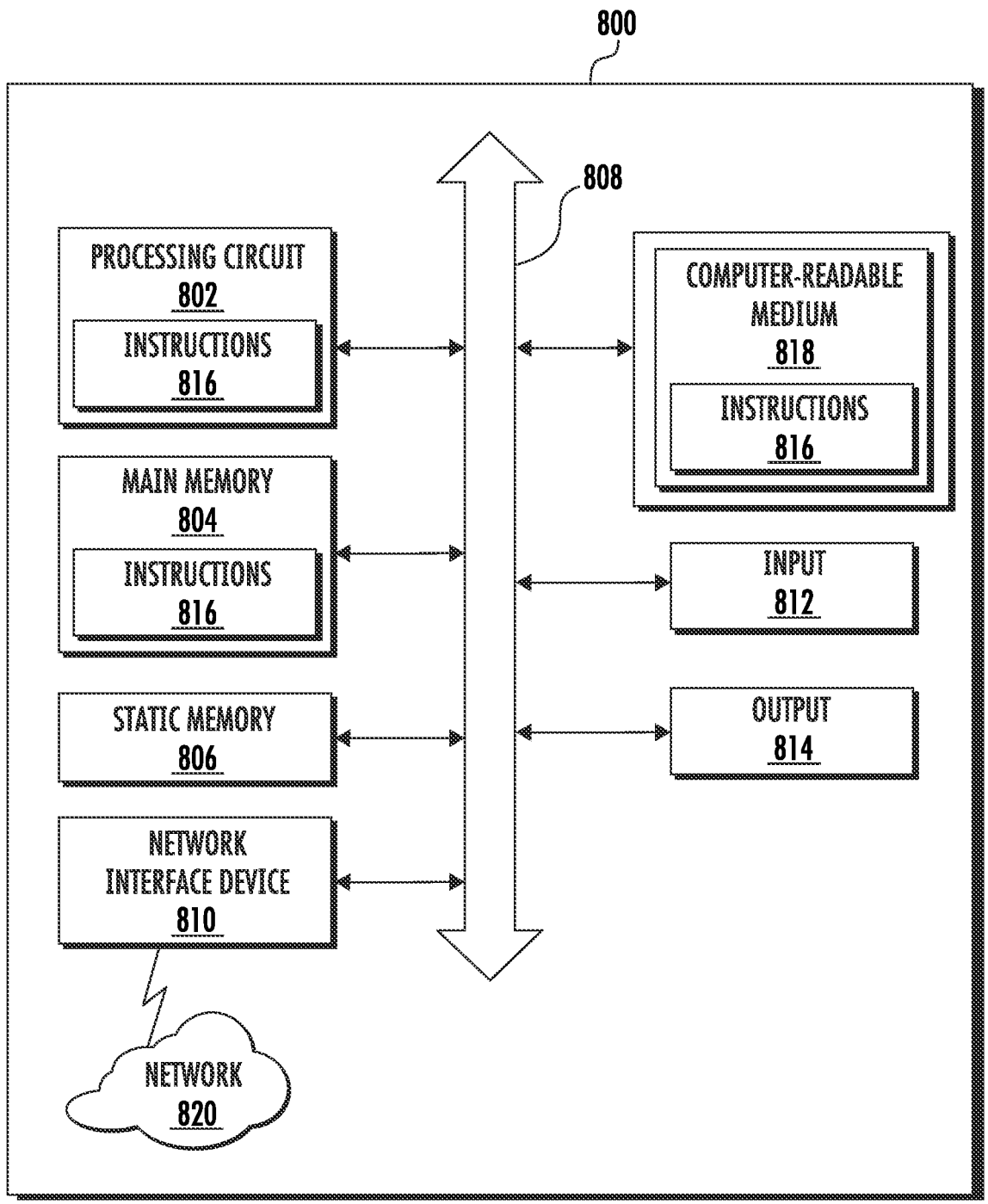
FIG. 8 is a schematic diagram of a representation of an exemplary computer system that can be included in or interfaced with any of the components in the WCS of FIG. 3 and the O-RAN communications system in FIG. 4 to support power saving in the wireless device, wherein the exemplary computer system is configured to execute instructions from an exemplary computer-readable medium.

Any of the circuits in the WCS 300 of FIG. 3 and the O-RAN communications system 400 of FIG. 4, such as the processing circuit 418, can include a computer system 800, such as that shown in FIG. 8, to carry out their functions and operations. With reference to FIG. 8, the computer system 800 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 800 in this embodiment includes a processing circuit or processor 802, a main memory 804 (e.g., read-only memory (ROM), flash memory, dynamic random-access memory (DRAM) such as synchronous DRAM (SDRAM), etc.), and a static memory 806 (e.g., flash memory, static random-access memory (SRAM), etc.), which may communicate with each other via a data bus 808. Alternatively, the processing circuit 802 may be connected to the main memory 804 and/or static memory 806 directly or via some other connectivity means. The processing circuit 802 may be a controller, and the main memory 804 or static memory 806 may be any type of memory.

The processing circuit 802 represents one or more general-purpose processing circuits such as a microprocessor, central processing unit, or the like. More particularly, the processing circuit 802 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 802 is configured to execute processing logic in instructions 816 for performing the operations and steps discussed herein.

The computer system 800 may further include a network interface device 810. The computer system 800 also may or may not include an input 812 to receive input and selections to be communicated to the computer system 800 when executing instructions. The computer system 800 also may or may not include an output 814, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 800 may or may not include a data storage device that includes instructions 816 stored in a computer-readable medium 818. The instructions 816 may also reside, completely or at least partially, within the main memory 804 and/or within the processing circuit 802 during execution thereof by the computer system 800, the main memory 804 and the processing circuit 802 also constituting the computer-readable medium 818. The instructions 816 may further be transmitted or received over a network 820 via the network interface device 810.

While the computer-readable medium 818 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

I claim:

1. A radio access network (RAN) communications system, comprising:
   a remote radio circuit comprising at least one antenna port coupled to at least one antenna to receive at least one random-access symbol comprising a cyclic prefix (CP) followed by a random-access sequence; and
   an open fronthaul gateway (OFG) circuit coupled to the remote radio circuit and comprising:
      a networking port coupled to a distribution unit (DU); and
      a processing circuit configured to:
         determine a group delay between the at least one antenna port and the networking port;
         determine a start of the CP in the at least one random-access symbol based on the determined group delay; and
         remove the CP from the at least one random-access symbol based on the determined start of the CP.

2. The RAN communications system of claim 1, wherein the processing circuit is further configured to communicate the random-access sequence in the at least one random-access symbol to the DU via the networking port.

3. The RAN communications system of claim 2, wherein the processing circuit is further configured to:
   convert the random-access sequence from a time domain data to a frequency domain data; and
   communicate the frequency domain data to the DU via the networking port.

4. The RAN communications system of claim 3, wherein the processing circuit is further configured to perform a Fast Fourier Transform (FFT) to convert the random-access sequence from the time domain data into the frequency domain data.

5. The RAN communications system of claim 3, wherein:
   the networking port comprises an Ethernet port; and
   the processing circuit is further configured to encode the frequency domain data based on common public radio interface (CPRI) protocol for communication via the Ethernet port.

6. The RAN communications system of claim 1, further comprising a digital routing circuit coupled between the remote radio circuit and the OFG circuit, wherein the group delay between the at least one antenna port and the networking port comprises:
   a first processing delay in the remote radio circuit;
   a first propagation delay from the remote radio circuit to the digital routing circuit;
   a second processing delay in the digital routing circuit;
   a second propagation delay from the digital routing circuit to the OFG circuit; and
   a third processing delay in the OFG circuit.

7. The RAN communications system of claim 6, wherein the processing circuit is further configured to:
   send a test packet with a known pattern toward the remote radio circuit;
   measure a round-trip delay upon receiving the test packet returned by the remote radio circuit; and
   determine the first propagation delay, the second processing delay, and the second propagation delay as being equal to one-half of the measured round-trip delay.

8. The RAN communications system of claim 7, wherein the OFG circuit further comprises a memory circuit configured to pre-store the first processing delay and the third processing delay.

9. The RAN communications system of claim 6, further comprising:
   an O-RAN DU (O-DU) comprising the DU; and
   an O-RAN RU (O-RU) comprising the remote radio circuit, the digital routing circuit, and the OFG circuit.

10. A method for detecting and removing a cyclic prefix (CP) in a wireless communications system (WCS), comprising:
    receiving at least one random-access symbol comprising the CP followed by a random-access sequence;
    determining a group delay associated with at least one random-access symbol;
    determining a start of the CP in the at least one random-access symbol based on the determined group delay; and
    removing the CP from the at least one random-access symbol based on the determined start of the CP.

11. The method of claim 10, further comprising communicating the random-access sequence in the at least one random-access symbol.

12. The method of claim 11, further comprising:
    converting the random-access sequence from a time domain data to a frequency domain data; and
    communicating the frequency domain data.

13. The method of claim 12, further comprising performing a Fast Fourier Transform (FFT) to convert the random-access sequence from the time domain data into the frequency domain data.

14. The method of claim 12, further comprising encoding the frequency domain data based on a common public radio interface (CPRI) protocol.

15. The method of claim 10, further comprising determining the group delay that comprises:

a first processing delay in a remote radio circuit;
a first propagation delay from the remote radio circuit to a digital routing circuit;
a second processing delay in the digital routing circuit;
a second propagation delay from the digital routing circuit to an open fronthaul gateway (OFG) circuit; and
a third processing delay in the OFG circuit.

16. The method of claim 15, further comprising:
sending a test packet with a known pattern from the OFG circuit toward the remote radio circuit;
measuring a round-trip delay upon receiving the test packet returned by the remote radio circuit; and
determining the first propagation delay, the second processing delay, and the second propagation delay as being equal to one-half of the measured round-trip delay.

17. The method of claim 16, further comprising pre-storing the first processing delay and the third processing delay.

18. A wireless communications system (WCS), comprising:
a radio access network (RAN) communications system, comprising:
a distribution unit (DU);
a remote radio circuit comprising at least one antenna port coupled to at least one antenna to receive at least one random-access symbol comprising a cyclic prefix (CP) followed by a random-access sequence; and
an open fronthaul gateway (OFG) circuit coupled to the remote radio circuit and comprising:
a networking port coupled to the DU; and
a processing circuit configured to:
determine a group delay between the at least one antenna port and the networking port;
determine a start of the CP in the at least one random-access symbol based on the determined group delay;
remove the CP from the at least one random-access symbol based on the determined start of the CP; and
communicate the random-access sequence in the at least one random-access symbol to the DU via the networking port.

19. The WCS of claim 18, wherein the RAN communications system further comprises a digital routing circuit coupled between the remote radio circuit and the OFG circuit, wherein the group delay between the at least one antenna port and the networking port comprises:
a first processing delay in the remote radio circuit;
a first propagation delay from the remote radio circuit to the digital routing circuit;
a second processing delay in the digital routing circuit;
a second propagation delay from the digital routing circuit to the OFG circuit; and
a third processing delay in the OFG circuit.

20. The WCS of claim 18, further comprising a distributed communications system (DCS), the DCS comprising:
a digital routing unit (DRU) coupled to a centralized services node via a baseband unit (BBU); and
a plurality of remote units each coupled to the DRU via a plurality of optical fiber-based communications mediums, respectively;
wherein:
the DRU comprises:
an electrical-to-optical (E/O) converter configured to convert a plurality of downlink communications signals into a plurality of downlink optical communications signals, respectively; and
an optical-to-electrical (O/E) converter configured to convert a plurality of uplink optical communications signals into a plurality of uplink communications signals, respectively; and
the plurality of remote units each comprises:
a respective O/E converter configured to convert a respective one of the plurality of downlink optical communications signals into a respective one of the plurality of downlink communications signals; and
a respective E/O converter configured to convert a respective one of the plurality of uplink communications signals into a respective one of the plurality of uplink optical communications signals.

* * * * *